Sept. 3, 1946.  D. C. HOLMES  2,407,155
FLEXIBLE JOINT
Filed March 2, 1943  2 Sheets-Sheet 2
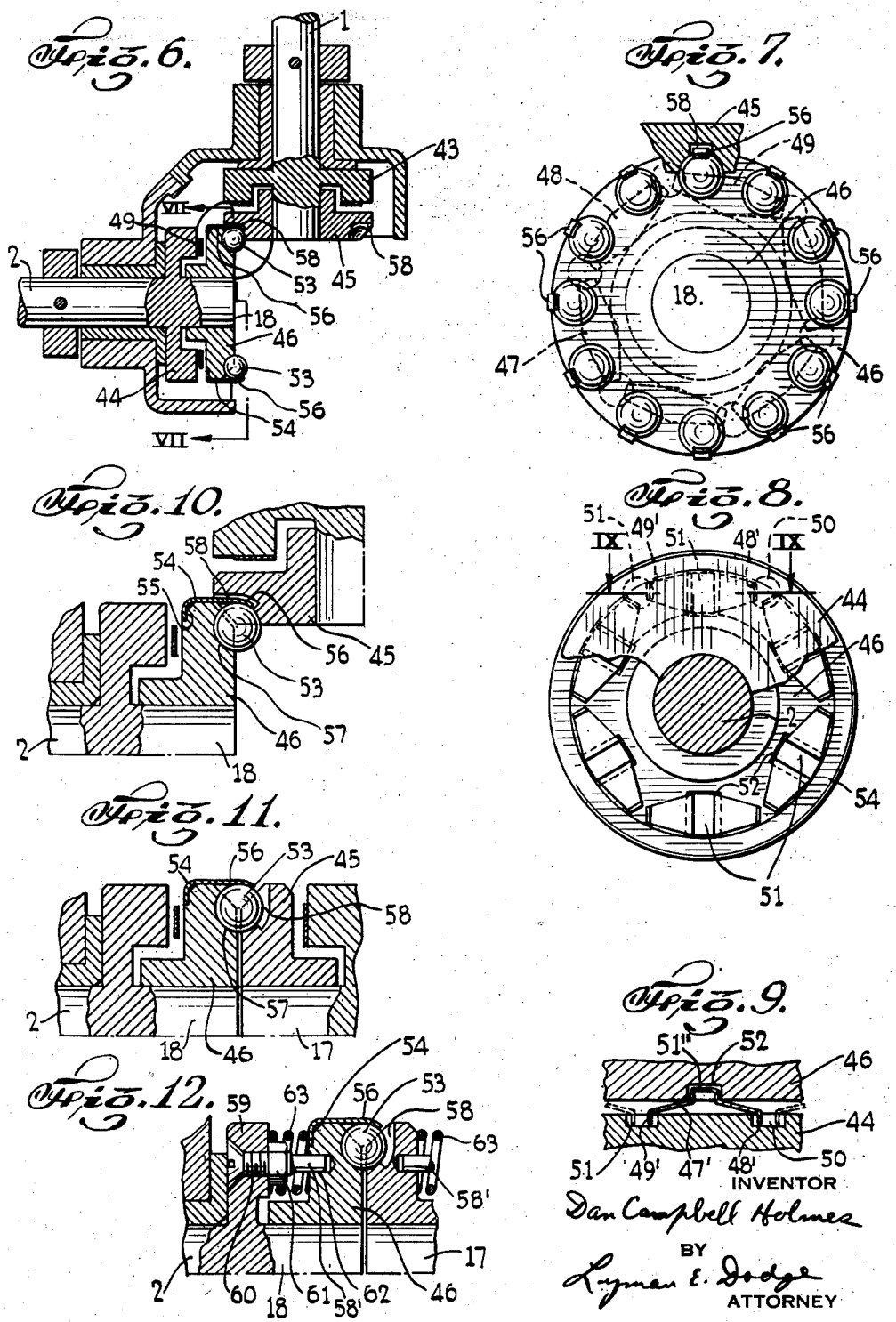

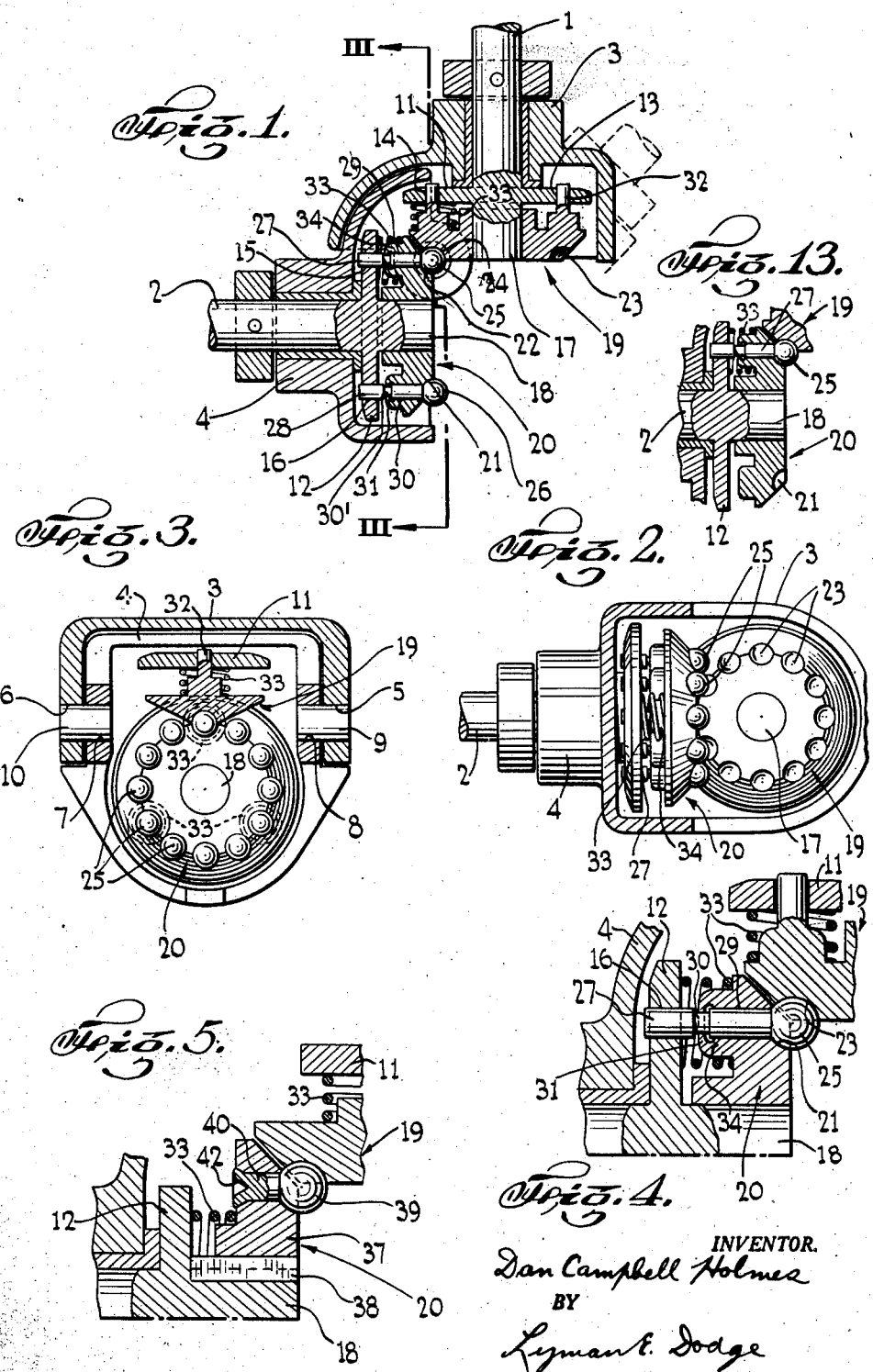

Patented Sept. 3, 1946

2,407,155

UNITED STATES PATENT OFFICE 2,407,155

FLEXIBLE JOINT

Dan Campbell Holmes, New York, N. Y.

Application March 2, 1943, Serial No. 477,702

5 Claims. (Cl. 74—385)

This invention relates to machine elements, particularly coupling elements, and more especially flexible shaft couplings.

A principal object of this invention is the production of a device of the type specified which will provide spherical surfaces of contact for interengaging driving and driven elements.

A further object of the invention is the provision of a device of the type specified which will be so constructed that the rate of driving from the driving member to the driven member will be constant.

Other objects and advantages will appear as the description of the particular physical embodiments selected to illustrate the invention progresses, and the novel features will be particularly pointed out in the appended claims.

In describing the invention in detail, and the particular physical embodiment selected to illustrate the invention reference will be had to the accompanying drawings and the several views thereon in which like characters of reference designate like parts throughout the several views, and in which:

Figure 1 is a cross-sectional view of a device embodying my invention; Fig. 2 is a side elevational view of the device, as shown by Fig. 1, with some parts shown in section to more clearly illustrate the construction, the structure shown being as it would appear if viewed from the bottom of Fig. 1; Fig. 3 is a cross-sectional view of the device as shown by Fig. 1 on the plane indicated by the line III—III of Fig. 1, viewed in the direction of the arrows at the ends of the line; Fig. 4 is a fragmentary detail cross-sectional view on the same plane as that upon which Fig. 1 was taken but enlarged to more clearly illustrate the method of retaining driving pins in place; Fig. 5 is a view corresponding to Fig. 4 but illustrating a modified form of ball driving member; Fig. 6 is a view corresponding to Fig. 1 but showing a modified form of coupling; Fig. 7 is a cross-sectional view of the device as shown by Fig. 6 on the plane indicated by the line VII—VII of Fig. 6, viewed in the direction of the arrows at the ends of the line. Fig. 8 is a view showing the opposite side of the device as shown in Fig. 7; Fig. 9 is a fragmentary cross-sectional view of the device as shown by Fig. 8 on the plane indicated by the line IX—IX of Fig. 8, viewed in the direction of the arrows at the ends of the line; Fig. 10 is an enlarged fragmentary view in section taken on the same plane as the view Fig. 6; Fig. 11 is a similar view but with the shafts in alignment. Fig. 12 is a view corresponding to Fig. 11 but illustrating a modified form of driving means. Fig. 13 is a view corresponding to Fig. 4, but illustrating a modified form.

The device, in general, includes a shaft 1 which may be a driven or a driving shaft and a shaft 2 which may be a driving or a driven shaft. Each shaft is mounted for rotation in a casing or body, as 3 and 4, respectively.

The bodies 3 and 4 are provided with a linking hinged joint, that is, each body, as 3 and 4, is provided on each side with orifices, as 5 and 6, and 7 and 8. Within these orifices there are pintle pins, as 9 and 10. By this construction, the two bodies are mutually hinged so that they may be moved to a position, as shown in Fig. 1, in which the shafts 1 and 2 are substantially at a right angle one to the other or they may be moved into a position in which the shafts 1 and 2 may be in line, and they may be moved to any position intermediate the two positions specified. By this construction the joint is adaptable for interconnecting two shafts positioned at various angles one to the other and so the joint functions as the ordinary and well known flexible joint.

Each of the shafts, as 1 and 2, is provided with a driving flange, as 11 and 12, respectively. This flange may be attached to the shaft in any suitable or appropriate manner. I have shown it as integral therewith and prefer such construction. Each of the driving flanges is provided with a plurality of orifices, as 13 and 14 on flange 11, and 15 and 16 on flange 12.

The stub or ends, 17 and 18, of the shafts, as 1 and 2, extending from the driving flanges have gears mounted thereon. These gears are designated 19 and 20, respectively. One serves as the driver, the other as the driven. These gears, 19 and 20, nicely fit the stubs 17 and 18 but are movable relatively thereto.

Each of the gears, 19 and 20, is provided with a plurality of spherical depressions, as 21 and 22 on gear 20, and 23 and 24 on gear 19. These spherical depressions are hollow truncated hemispheres.

In order to drive one gear 19 from the other gear 20, or vice versa, balls, as 25 and 26, are positioned in depressions on one or the other or both of the gears 19 and 20. If they are placed on both of the gears 19 and 20 they would be positioned alternatively, as in Fig. 13, but I prefer to place them all in the depressions of one gear, as 20. These balls precisely fit the spherical surface of the interengaging gear depression and when nicely fitted within that depression the driving effort is distributed thereover. This immensely reduces the wear upon the interengaging driving and driven surfaces and is the outstanding point of novelty of my construction over prior construction.

Various means may be used to retain the driving balls in the depressions of a gear. I prefer to employ driving pins formed with spherical ends. In Fig. 1 there are shown pins, as 27 and 28, upon which the spherical ends or balls, 25 and 26, are formed. These pins, 27 and 28, are received in orifices, as 29 and 30, of a gear and are of such length that they extend into the driving orifices, as 15 and 16, of the driving flange 12 so that they serve not only as prolongations of the balls, 25 and 26, but also as a driving means between a flange, as 12, and a gear as 20. In order to retain these driving pins, as 27 and 28, in place, I prefer to form a reduced portion on each one, as 30, and after they have been put in place I upset the metal of the gear 20, as at 31, so that this metal extends into the groove 30 so that the pins, as 16, only have a slight longitudinal movement, if any.

The same construction of drive pin may be used to drive the inter-connecting gear 19 but I prefer integral pins, as 32.

In order to keep gears 19 and 20 in proper operative position, I support them resiliently so that each is pressed outwardly toward the end of the shaft upon which it is positioned. This is done by means of a plurality of springs, as 33, positioned between the back of a gear and the front of a driving flange. In order to retain these springs in place I provide a projection, as 34, on the back of a gear, as 20, which is surrounded by the spring 33 so that it is retained in place.

In order that I may secure the proper and largest surface of contact between a ball, as 26, and the surface of a depression, as 23, each of the gears, as 19 and 20, is formed with a side face adjacent the front face of the gear positioned at an angle of about 45° thereto, as at 35 and 36.

By the construction hereinbefore described it will be seen that a flexible joint is provided in which one shaft may be driven from another shaft by means making a spherical surface contact one with the other and that the surface is of comparatively large area so that wear is reduced to a minimum. It will also be seen that by the provision of resiliently pressed gears intimacy of contact between the driving and driven member is maintained at all times.

In Fig. 5, a modified form of a driving means and ball construction is shown. In this modification the gear 37 corresponding to the gear 20 of Fig. 1 is keyed as by the key 38 to the shaft 18 so that it must revolve therewith but may move longitudinally thereof. The ball driving member 39 corresponding to the ball, as 25, of Fig. 1 is on the end of a pin, as 40, but this pin does not act as driving pin. It is merely inserted in an orifice 31 of the gear 37 and secured to that gear by suitable and appropriate means as by upsetting the end thereof as at 42.

The modified form as shown in Figs. 6 to 11 inclusive is one in which the driving flanges, as 43 and 44, on the shafts 1 and 2, respectively act to drive the gears, as 45 and 46, by means of an intermediate member which acts not only to drive but to resiliently press the gears away from the driving flanges. In this form, a plurality of plate springs, as 47, 48, and 49, are positioned between a gear, as 45, and a driving flange, as 43. Each of the springs 47, as well shown in Fig. 9, have their ends bent at about a right angle, as at 48' and 49', and protrude into a cavity, as 50 and 51, in the gear member, as 45 or 46, and the central portion of the spring 47' has a hump or bulge at 51' therein which protrudes into a cavity, as 52, in a driving flange, as 43 or 44, so that the spring member 47 is carried along or driven by the flange 43 and carries along or drives the gear, as 45, by means of the upturned ends 48' and 49' resting in cavities in the back face of the gear.

In this form I have also shown a complete ball as a driving means between the gear 45 and the gear 46. This ball 53 is retained in place by a ring member 54 seating in a groove 55 of the gear and provided with a plurality of fingers, as 56, extending outwardly and pressing against the ball 53 so as to retain it in the depression 57 of the gear, as 46. In this form of construction it is necessary to make a small cavity, as 58, opening into each of the depressions of the gear 45 to provide space for the retaining fingers, 56.

In Fig. 12 I have shown a form in which the balls, as 53, are used and retained in place by the members 56 but the driving means is a stud, as 58', which is attached to the driving flange 59 by any suitable or appropriate means as by being screw threaded therein, as at 60, and locked therein by the lock nut 61 screw threaded on to the stud. This stud projects into a cavity 62 of a gear, as 46. In this form the driving flange and the gear are spaced apart by a spring 63 comparable to the spring 33 of Fig. 1.

Although I have particularly described a preferred physical embodiment of my invention and modified forms thereof, nevertheless, I desire to have it understood that the forms selected are merely illustrative, but do not exhaust the possible physical embodiments of the idea of means underlying my invention.

What I claim as new and desire to secure by Letters Patent of the United States, is:

1. A flexible coupling, including, in combination: a first housing formed with an orifice for receiving a shaft; a second housing formed with an orifice for receiving a shaft; each of the housings provided with ears aligned with ears of the other housing and arranged in pairs and each ear formed with an aligning orifice and each orifice having a pivot pin therein; shafts, one in each of the first mentioned orifices of the housings; driving flanges, one attached to each shaft, each flange formed with a plurality of driving pin orifices; interengaging gears, one on the end of each shaft, each gear free on its shaft; each gear formed with a plurality of orifices for the reception of driving pins, said last mentioned orifices terminating at the outer face of the gear in partispherical hollows and each gear resiliently pressed away from its adjacent driving flange by springs; driving pins in the driving pin orifices of the flanges and the gears; the driving pins of one gear being formed with ball heads resting in the partispherical hollows whereby motion of one shaft may be transmitted to the other shaft.

2. A flexible coupling, including, in combination: a first housing formed with an orifice for receiving a shaft; a second housing formed with an orifice for receiving a shaft; each of the housings provided with ears aligned with ears of the other housing and arranged in pairs and each ear formed with an aligning orifice and each orifice having a pivot pin therein; shafts, one in each of the first mentioned orifices of the housings; driving flanges, one attached to each shaft, each flange formed with a plurality of driving pin orifices; interengaging gears, one on the end of each shaft, each gear free on its shaft; each gear formed with a plurality of orifices for the reception of driving pins, said last mentioned orifices terminating at the outer face of the gear in partispherical hollows, and each gear resiliently pressed away from its adjacent driving flange by springs; driving pins in the driving pin orifices of the flanges and the gears; the driving pins of one gear being formed with ball heads resting in the partispherical hollows whereby motion of one shaft may be transmitted to the other shaft at a constant rate.

3. A flexible coupling, including, in combination: a first housing formed with an orifice for receiving a shaft; a second housing formed with an orifice for receiving a shaft; each of the housings provided with ears aligned with ears of the other housing and arranged in pairs and each ear formed with an aligning orifice and each orifice having a pivot pin therein; shafts, one in each of the first mentioned orifices of the housings; driving flanges, one attached to each shaft, each flange formed with a plurality of driving pin orifices; interengaging gears, one on the end of each shaft, each gear free on its shaft; each gear formed with a plurality of orifices for the reception of driving pins, said last mentioned orifices terminating at the outer face of the gear in partispherical hollows and each gear resiliently pressed away from its adjacent driving flange by springs; driving pins in the driving pin orifices of the flanges and the gears; the driving pins of one gear being formed with ball heads resting in the partispherical hollows whereby motion of one shaft may be transmitted to the other shaft by contact of large extent between spherical surfaces.

4. A flexible coupling, including, in combination: a first housing formed with an orifice for receiving a shaft; a second housing formed with an orifice for receiving a shaft; each of the housings provided with ears aligned with ears of the other housing, and arranged in pairs and each ear formed with an aligning orifice and each orifice having a pivot pin therein; shafts, one in each of the first mentioned orifices of the housings; driving flanges, one attached to each shaft, each flange formed with a plurality of driving pin orifices; interengaging gears, one on the end of each shaft, each gear free on its shaft, each gear formed with a plurality of orifices for the reception or driving pins, said last mentioned orifices terminating at the outer face of the gear in partispherical hollows and each gear resiliently pressed away from its adjacent driving flange by springs; driving pins in the driving pin orifices of the flanges and the gears, the driving pins of one gear being formed with ball heads resting in the partispherical hollows whereby motion of one shaft may be transmitted to the other shaft by a spherical contact.

5. A gear body, said gear body mounted for rotation and provided with a face formed with a plurality of depressions each having a surface which is a portion of the inside surface of a hollow sphere; a second gear body similarly formed and mounted; ball ended members in each of the depressions of the second gear; means for retaining the ball ended members; means for resiliently pressing one gear toward the other so that the ball ended member of one gear may rest in the depressions of the other gear whereby rotary motion of one gear is transmitted to the other.

DAN CAMPBELL HOLMES.